US009049007B2

(12) United States Patent
Hong et al.

(10) Patent No.: US 9,049,007 B2
(45) Date of Patent: Jun. 2, 2015

(54) LOW-POWER ENCRYPTION APPARATUS AND METHOD

(71) Applicant: Electronics and Telecommunications Research Institute, Daejeon (KR)

(72) Inventors: Deukjo Hong, Daejeon (KR); Jung Keun Lee, Daejeon (KR); Dong-Chan Kim, Daejeon (KR); Daesung Kwon, Daejeon (KR); Kwon Ho Ryu, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 93 days.

(21) Appl. No.: 13/909,155

(22) Filed: Jun. 4, 2013

(65) Prior Publication Data

US 2013/0336480 A1 Dec. 19, 2013

(30) Foreign Application Priority Data

Jun. 15, 2012 (KR) ........................ 10-2012-0064278

(51) Int. Cl.
*G06F 21/00* (2013.01)
*H04L 9/08* (2006.01)
*H04L 9/06* (2006.01)

(52) U.S. Cl.
CPC ............ *H04L 9/0816* (2013.01); *H04L 9/0618* (2013.01); *H04L 2209/24* (2013.01)

(58) Field of Classification Search
CPC .. H04L 9/0816; H04L 9/0618; H04L 2209/24
USPC ......................................................... 380/44
See application file for complete search history.

(56) References Cited

U.S. PATENT DOCUMENTS

2003/0133568 A1 7/2003 Stein et al.
2005/0058285 A1 3/2005 Stein et al.
(Continued)

FOREIGN PATENT DOCUMENTS

EP  2048641 A1  4/2009
JP  2008-051829 A  3/2008
KR  10-2011-0055091 A  5/2011

OTHER PUBLICATIONS

Zheng Gong et al., "Klein: A New Family of Lightweight Block Ciphers", Lecture Notes in Computer Science, 2012.
Deukjo Hong et al., "HIGHT: A New Block Cipher Suitable for Low-Resource Device," Workshop on the Cryptographic Hardware and Embedded Systems, 2006.
Taizo Shirai et al., "The 128-bit Blockcipher CLEFIA," IEICE Technical Report, 2007.
(Continued)

*Primary Examiner* — Jeffrey Pwu
*Assistant Examiner* — William Corum, Jr.
(74) *Attorney, Agent, or Firm* — LRK Patent Law Firm

(57) ABSTRACT

An encryption apparatus and method that provide a mobile fast block cipher algorithm that supports low-power encryption. The encryption apparatus includes a user interface unit, a key scheduler unit, an initial conversion unit, a round function processing unit, and a final conversion unit. The user interface unit receives plain text to be encrypted and a master key. The key scheduler unit generates a round key from the master key. The initial conversion unit generates initial round function values from the plain text. The round function processing unit repeatedly processes a round function using the round key and the initial round function values. The final conversion unit generates ciphertext from the resulting values of the round function processed in a final round by the round function processing unit.

14 Claims, 5 Drawing Sheets

(56) References Cited

U.S. PATENT DOCUMENTS

| | | | |
|---|---|---|---|
| 2009/0214024 A1* | 8/2009 | Schneider | 380/28 |
| 2010/0220863 A1* | 9/2010 | Dupaquis et al. | 380/277 |
| 2011/0244830 A1 | 10/2011 | Chesnutt et al. | |
| 2013/0339753 A1* | 12/2013 | Shibutani et al. | 713/189 |

OTHER PUBLICATIONS

Youngdai Ko et al., "Linear Cryptanalysis on SPECTR-H64 with Higher Order Differential Property," Lecture Notes in Computer Science, 2003.

* cited by examiner

LOW-POWER ENCRYPTION APPARATUS AND METHOD

CROSS REFERENCE TO RELATED APPLICATION

This application claims the benefit of Korean Patent Application No. 10-2012-0064278, filed on Jun. 15, 2012, which is hereby incorporated by reference in its entirety into this application.

BACKGROUND OF THE INVENTION

1. Technical Field

The present invention relates generally to a low-power encryption apparatus and method and, more particularly, to an encryption apparatus and method that are capable of providing a mobile fast block cipher algorithm that supports low-power encryption.

2. Description of the Related Art

Block ciphers are key elements that are most widely used in encryption applications that are applied to the communication of a variety of types of devices and the security of stored data, and mainly function to encrypt data on a specific length (64-bit or 128-bit) basis and provide confidentiality. Furthermore, block ciphers are used for hash functions, message authentication code, random number generators, etc. In order to meet these purposes, block ciphers should be designed to have features suitable for the characteristics of devices and encryption applications, and are implemented as device-specific chips or software that is run by the CPU of a device.

In the case of hardware chips, the development of the chips has many limitations because of their marketability, developing cost, interoperability with devices, etc. In contrast, the application of software implementation has expanded thanks to the evolution of CPU performance, etc. However, in the case of software implementation, there are many environments that are associated with limited resources. In particular, mobile devices with batteries, such as the smart phones that have been popularized recently, are problematic in that power is consumed by the running of software. It is known that an internationally standardized block cipher having the best performance now increases battery consumption by 70% or higher during continuous encryption, compared to the case of no encryption.

Meanwhile, a block cipher technique that was developed for the purpose of H/W encryption operations in an ultra-light and low-power environment was disclosed in a paper entitled "HIGHT: A New Block Cipher Suitable for Low-Resource Device" and published in the workshop on the Cryptographic Hardware and Embedded Systems in 2006. However, the block cipher technique that was disclosed in this paper is problematic in that it has vulnerability in terms of safety and requests a relatively large number of cycles from a CPU in order to encrypt data in a software environment.

SUMMARY OF THE INVENTION

Accordingly, the present invention has been made keeping in mind the above problems occurring in the prior art, and an object of the present invention is to provide an encryption apparatus and method that use a block cipher algorithm that supports low-power encryption.

In order to accomplish the above object, the present invention provides an encryption apparatus, including a user interface unit configured to receive plain text to be encrypted and a master key; a key scheduler unit configured to generate a round key from the master key; an initial conversion unit configured to generate initial round function values from the plain text; a round function processing unit configured to repeatedly process a round function using the round key and the initial round function values; and a final conversion unit configured to generate ciphertext from the resulting values of the round function processed in a final round by the round function processing unit.

The key scheduler unit may include a master key input unit configured to receive the master key from the user interface unit; a key schedule round function value generation unit configured to generate initial key schedule round function values from respective sub-master key values that constitute the master key; and a round key generation unit configured to generate key schedule round function values using the initial key schedule round function values and fixed constant values and generate the round key by consecutively arranging the key schedule round function values.

The round key may have a length of 192 bits, and be formed by consecutively sub-round keys arranging sub-round keys $RK_i[0]$, $RK_i[1]$, $RK_i[2]$. $RK_i[3]$, $RK_i[4]$, and $RK_i[5]$ each having a length of 32 bits.

The initial conversion unit may extract pieces of sub-plain text $P[0]$, $P[1]$, $P[2]$, and $P[3]$ each having a length of 32 bits from the plain text having a length of 128 bits, and generate initial round function values $X_0[0]$, $X_0[1]$, $X_0[2]$, and $X_0[3]$ from the pieces of sub-plain text $P[0]$, $P[1]$, $P[2]$, and $P[3]$, respectively.

The round function processing unit may compute the resulting values $X_{i+1}[0]$, $X_{i+1}[1]$, $X_{i+1}[2]$, and $X_{i+1}[3]$ of a round function in an i-th round by processing the round function based on the round key and the initial round function values.

The round function processing unit may compute $X_{i+1}[0]$ using Equation $X_{i+1}[0] \leftarrow ROL_9((X_i[0] \oplus RK_i[0]) + (X_i[1] \oplus RK_i[1]))$, compute $X_{i+1}[1]$ using Equation $X_{i+1}[1] \leftarrow ROL_5((X_i[1] \oplus RK_i[2]) + (X_i[2] \oplus RK_i[3]))$, compute $X_{i+1}[2]$ using Equation $X_{i+1}[2] \leftarrow ROL_3((X_i[2] \oplus RK_i[4]) + (X_i[3] \oplus RK_i[5]))$, and compute $X_{i+1}[3]$ using Equation $X_{i+1}[3] \leftarrow X_i[0]$, wherein $X_i[0]$, $X_i[1]$, $X_i[2]$, and $X_i[3]$ denote the results of the round function in an (i−1)-th round, $\oplus$ denotes an XOR operation, + denotes a modulo 232 addition operation, $ROL_a(x)$ denotes the function of circularly shifting value x having a length of 32 bits to the left by "a" bits and outputting the resulting value, and $ROR_a(x)$ denotes the function of circularly shifting value x having a length of 32 bits to the right by "a" bits and outputting the resulting value.

The final conversion unit may generate the ciphertext by consecutively arranging the resulting values of the round function obtained in the final round.

The encryption apparatus may further include a ciphertext output unit configured to output the ciphertext generated by the final conversion unit.

In order to accomplish the above object, the present invention provides an encryption method, including receiving, by a user interface unit plain text to be encrypted and a master key; generating, by a key scheduler unit, a round key from the master key; generating, by an initial conversion unit, initial round function values from the plain text; repeatedly processing, by a round function processing unit, a round function using the round key and the initial round function values; and generating, by a final conversion unit, ciphertext from resulting values of the round function processed in a final round by the round function processing unit.

The generating a round key from the master key may include receiving, by a master key input unit, the master key from the user interface unit; generating, by a key schedule round function value generation unit, initial key schedule round function values from respective sub-master key values that constitute the master key; and generating, by a round key generation unit, key schedule round function values using the initial key schedule round function values and fixed constant values, and generating, by the round key generation unit, the round key by consecutively arranging the key schedule round function values.

The round key may have a length of 192 bits, and be formed by consecutively sub-round keys arranging sub-round keys $RK_i[0]$, $RK_i[1]$, $RK_i[2]$, $RK_i[3]$, $RK_i[4]$, and $RK_i[5]$ each having a length of 32 bits.

The generating initial round function values from the plain text may include extracting pieces of sub-plain text P[0], P[1], P[2], and P[3] each having a length of 32 bits from the plain text having a length of 128 bits, and generating initial round function values $X_0[0]$, $X_0[1]$, $X_0[2]$, and $X_0[3]$ from the pieces of sub-plain text P[0], P[1]. P[2], and P[3], respectively.

The repeatedly processing a round function using the round key and the initial round function values may include computing the resulting values $X_{i+1}[0]$, $X_{i+1}[1]$, $X_{i+1}[2]$, and $X_{i+1}[3]$ of a round function in an i-th round by processing the round function based on the round key and the initial round function values.

The repeatedly processing a round function using the round key and the initial round function values may include computing $X_{i+1}[0]$ using Equation $X_{i+1}[0] \leftarrow ROL_9((X_i[0] \oplus RK_i[0]) + (X_i[1] \oplus RK_i[1]))$, computing $X_{i+1}[1]$ using Equation $X_{i+1}[1] \leftarrow ROR_5((X_i[1] \oplus RK_i[2]) + (X_i[2] \oplus RK_i[3]))$, computing $X_{i+1}[2]$ using Equation $X_{i+1}[2] \leftarrow ROR_3((X_i[2] \oplus RK_i[4]) + (X_i[3] \oplus RK_i[5]))$, and computing $X_{i+1}[3]$ using Equation $X_{i+1}[3] \leftarrow X_i[0]$, wherein $X_i[0]$, $X_i[1]$, $X_i[2]$, and $X_i[3]$ denote the results of the round function in an (i−1)-th round, ⊕ denotes an XOR operation, + denotes a modulo 232 addition operation, $ROL_a(x)$ denotes the function of circularly shifting value x having a length of 32 bits to the left by "a" bits and outputting the resulting value, and $ROR_a(x)$ denotes the function of circularly shifting value x having a length of 32 bits to the right by "a" bits and outputting the resulting value.

The generating ciphertext from the resulting values of the round function processed in a final round may include generating the ciphertext by consecutively arranging the resulting values of the round function obtained in the final round.

The encryption method may further include outputting, by a ciphertext output unit, the ciphertext generated by the final conversion unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
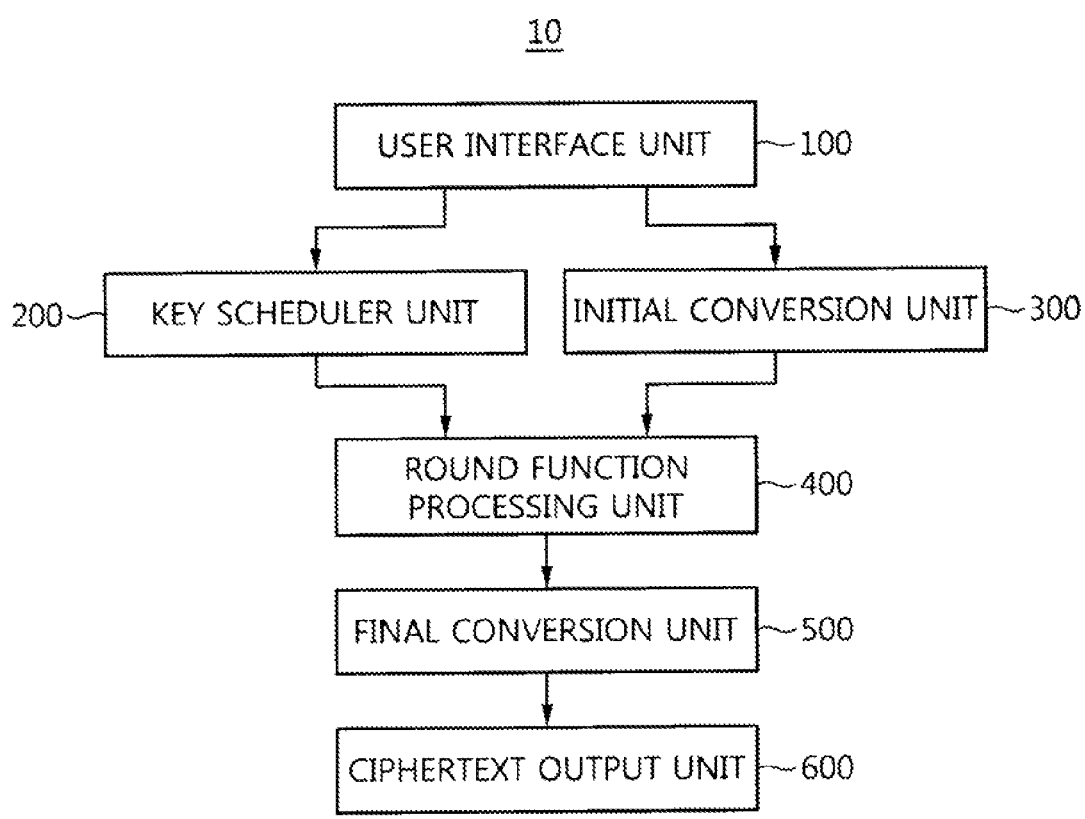
FIG. 1 is a block diagram showing the configuration of an encryption apparatus according to the present invention.

The present invention will be described in detail below with reference to the accompanying drawings. Repealed descriptions and descriptions of known functions and constructions which have been deemed to make the gist of the present invention unnecessarily vague will be omitted below. The embodiments of the present invention are provided in order to fully describe the present invention to a person having ordinary skill in the art. Accordingly, the shapes, sizes, etc. of elements in the drawings may be exaggerated to make the description clear.

The configuration and operation of an encryption apparatus according to the present invention will be described with reference to FIGS. 1 to 3.

Figure 2:
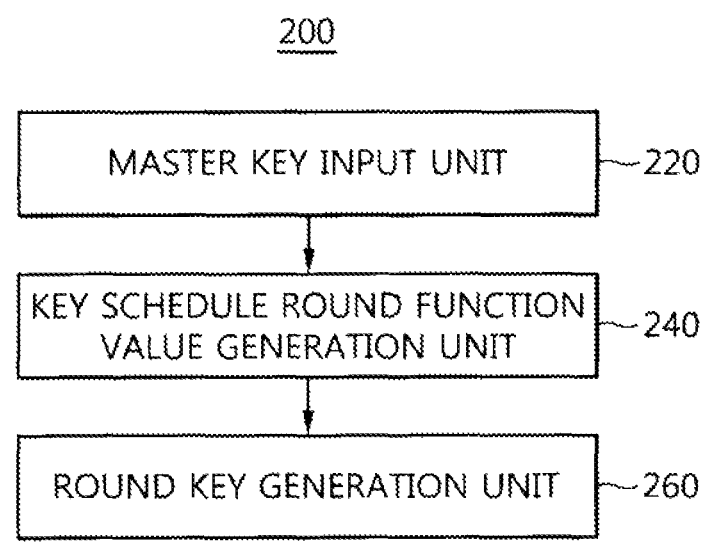
FIG. 2 is a block diagram showing the configuration of the key scheduler unit shown in FIG. 1.

FIG. 1 is a block diagram showing the configuration of an encryption apparatus 10 according to the present invention.

Referring to FIG. 1, the encryption apparatus 10 according to the present invention includes a user interface unit 100, a key scheduler unit 200, an initial conversion unit 300, a round function processing unit 400, a final conversion unit 500, and a ciphertext output unit 600.

The user interface unit 100 receives an object to be encrypted, for example, specific text or voice, referred to as "plain text" (hereinafter designated as "P"), from a user. Furthermore, the user interface unit 100 receives a master key (hereinafter designated as "MK") from the user at the same time it receives the plain text. Here, the master key input to the user interface unit 100 has a length of 128 bits, 192 bits or 256 bits, and includes sub-master keys each having a length of 32 bits. That is, the master key MK includes a plurality of consecutive sub-master keys. A master key having a length of 128 bits, a master key having a length of 192 bits, and a master key having a length of 256 bits may be represented by the following Equations 1 to 3, respectively $$MK = K[0] \| K[1] \| K[2] \| K[3] \tag{1}$$

$$MK = K[0] \| K[1] \| K[2] \| K[3] \| [4] \| [5] \tag{2}$$

$$MK = K[0] \| K[1] \| K[2] \| K[3] \| [4] \| [5] \| [6] \| [7] \tag{3}$$

In the above equation, K[0] to K[7] are sub-master keys each having a length of 32 bits, which constitute the master key MK.

Meanwhile, the plain text input to the user interface unit 100 has a length of 128 bits, and includes a plurality of pieces of sub-plain text each having a length of 32 bits. That is, the plain text P includes a plurality of pieces of consecutive sub-plain text. The plain text having a length of 128 bits may be presented by the following Equation 4:

$$P = P[0] \| P[1] \| PK[2] \| P[3] \tag{4}$$

In the above equation, P[0] to P[3] are pieces of sub-plane text each having a length of 32 bits, which constitute the plain text P.

The user interface unit 100 sends the master key MK and the plain text P, received from the user, to the key scheduler unit 200 and the initial conversion unit 300, respectively.

The key scheduler unit 200 receives the master key from the user interface unit 100, and generates a round key (hereinafter designated as "RK") from the master key. More specifically, the key scheduler unit 200 includes a master key input unit 220, a key schedule round function value generation unit 240, and a round key generation unit 260, as shown in FIG. 2.

The master key input unit 220 receives the master key from the user interface unit 100, and sends the master key to the key schedule round function value generation unit 240.

The key schedule round function value generation unit 240 extracts sub-master key values from the master key received from the master key input unit 220, and generates initial key schedule round function values from the extracted sub-master key values, respectively.

In this case, the key schedule round function value generation unit 240, if the received master key has a length of 128 bits, determines initial key schedule round function value $T_0[1]$ to $T_0[3]$ using the following Equation 5:

$$T_0[k] \leftarrow K[k], 0 \leq k \leq 3 \quad (5)$$

In contrast, the key schedule round function value generation unit 240, if the received master key has a length of 192 bits, determines initial key schedule round function value $T_0[1]$ to $T_0[5]$ using the following Equation 6:

$$T_0[k] \leftarrow K[k], 0 \leq k \leq 5 \quad (6)$$

In contrast, the key schedule round function value generation unit 240, if the received master key has a length of 256 bits, determines initial key schedule round function value $T_0[1]$ to $T_0[7]$ using the following Equation 7:

$$T_0[k] \leftarrow K[k], 0 \leq k \leq 7 \quad (7)$$

The round key generation unit 260 generates key schedule round function values using the initial key schedule round function values generated by the key schedule round function value generation unit 240 and fixed constant values, and generates a round key by consecutively arranging the key schedule round function values. Here, the round key generation unit 260 may use fixed constant values $\delta[0]$ to $\delta[7]$ represented as hexadecimal numbers, for example, as shown in the following Equation 8, in order to generate the key schedule round function values.

$\delta[0] = $ 0xc3efe9db, $\delta[1] = $ 0x44626b02, $\delta[2] = $ 0x79e27c8a, $\delta[3] = $ 0x78df30ec, $\delta[4] = $ 0x715ea49e, $\delta[5] = $ 0xc785da0a, $\delta[6] = $ 0xe04ef22a, $\delta[7] = $ 0xe5c40957 \quad (8)

The round key generation unit 260, if the master key received from the user interface unit 100 has a length of 128 bits, determines key schedule round function values each having a length of 32 bits using the following Equation 9, and generates a round key by consecutively arranging the key schedule round function values using the following Equation 10:

$$T_{i+1}[0] \leftarrow ROL_1(T_i[0] + ROL_i(\delta[i \bmod 4])),$$

$$T_{i+1}[1] \leftarrow ROL_3(T_i[1] + ROL_{i+1}(\delta[i \bmod 4])),$$

$$T_{i+1}[2] \leftarrow ROL_6(T_i[2] + ROL_{i+2}(\delta[i \bmod 4])),$$

$$T_{i+1}[3] \leftarrow ROL_{11}(T_i[3] + ROL_{i+3}(\delta[i \bmod 4])), 0 \leq i \leq 23 \quad (9)$$

$$RK_i \leftarrow T_{i+1}[0] \| T_{i+1}[1] \| T_{i+1}[2] \| T_{i+1}[1] \| T_{i+1}[3] \| T_{i+1}[1] \quad (10)$$

Furthermore, the round key generation unit 260, if the master key received from the user interface unit 100 has a length of 192 bits, determines key schedule round function values each having a length of 32 bits using the following Equation 11, and generates a round key by consecutively arranging the key schedule round function values using the following Equation 12:

$$T_{i+1}[0] \leftarrow ROL_1(T_i[0] + ROL_i(\delta[i \bmod 6])).$$

$$T_{i+1}[1] \leftarrow ROL_3(T_i[1] + ROL_{i+1}(\delta[i \bmod 6])),$$

$$T_{i+1}[2] \leftarrow ROL_6(T_i[2] + ROL_{i+2}(\delta[i \bmod 6])),$$

$$T_{i+1}[3] \leftarrow ROL_{11}(T_i[3] + ROL_{i+3}(\delta[i \bmod 6])),$$

$$T_{i+1}[4] \leftarrow ROL_{13}(T_i[4] + ROL_{i+4}(\delta[i \bmod 6])),$$

$$T_{i+1}[5] \leftarrow ROL_{17}(T_i[5] + ROL_{i+5}(\delta[i \bmod 6])), 0 \leq i \leq 27 \quad (11)$$

$$RK_i \leftarrow T_{i+1}[0] \| T_{i+1}[1] \| T_{i+1}[2] \| T_{i+1}[3] \| T_{i+1}[4] \| T_{i+1}[5] \quad (12)$$

Furthermore, the round key generation unit 260, if the master key received from the user interface unit 100 has a length of 256 bits, determines key schedule round function values each having a length of 32 bits using the following Equation 13, and generates a round key by consecutively arranging the key schedule round function values using the following Equation 14:

$$T_{i+1}[6i \bmod 8] \leftarrow ROL_1(T_i[6i \bmod 8] + ROL_i(\delta[i \bmod 8]))),$$

$$T_{i+1}[6i+1 \bmod 8] \leftarrow ROL_3(T_i[6i+1 \bmod 8] + ROL_{i+1}(\delta[i \bmod 8]))),$$

$$T_{i+1}[6i+2 \bmod 8] \leftarrow ROL_6(T_i[6i+2 \bmod 8] + ROL_{i+2}(\delta[i \bmod 8]))),$$

$$T_{i+1}[6i+3 \bmod 8] \leftarrow ROL_{11}(T_i[6i+3 \bmod 8] + ROL_{i+3}(\delta[i \bmod 8]))),$$

$$T_{i+1}[6i+4 \bmod 8] \leftarrow ROL_{13}(T_i[6i+4 \bmod 8] + ROL_{i+4}(\delta[i \bmod 8]))),$$

$$T_{i+1}[6i+5 \bmod 8] \leftarrow ROL_{17}(T_i[6i+5 \bmod 8] + ROL_{i+5}(\delta[i \bmod 8]))),$$

$$T_{i+1}[6i+6 \bmod 8] \leftarrow T_i(6i+6 \bmod 8],$$

$$T_{i+1}[6i+7 \bmod 8] \leftarrow T_i[6i+7 \bmod 8], 0 \leq i \leq 31 \quad (13)$$

$$RK_i \leftarrow T_{i+1}[6i \bmod 8] \| T_{i+1}[6i+1 \bmod 8] \| T_{i+1}[6i+2 \bmod 8] \| T_{i+1}[6i+3 \bmod 8] \| T_{i+1}[6i+4 \bmod 8] \| T_{i+1}[6i+5 \bmod 8] \quad (14)$$

In the above equations, the modulo operation "x mod 4" is an operation that calculates the remainder that is obtained by dividing value x by 4, the modulo operation "x mod 6" is an operation that calculates the remainder that is obtained by dividing value x by 6, and the modulo operation "x mod 8" is an operation that calculates the remainder that is obtained by dividing value x by 8.

Meanwhile, the round key RK generated by the round key generation unit 260 is always allowed to have the same length of 128 bits by Equations 10, 12 or 14 even when the master key MK has any one length of 128 bits, 192 bits or 256 bits. Here, the round key $RK_i$ having a length of 128 bits may be formed by consecutively arranging sub-round keys $RK_i[0]$ to $RK_i[5]$ each having a length of 32 bits, as shown in Equation 15:

$$RK_i = RK_i[0] \| RK_i[1] \| RK_i[2] \| RK_i[3] \| RK_i[4] \| RK_i[5] \quad (15)$$

The initial conversion unit 300 receives plain text from the user interface unit 100, and generates initial round function values from the plain text. That is, the initial conversion unit 300 extracts pieces of sub-plain text P[0], P[1], P[2], and P[3] each having a length of 32 bits from the plain text P having a length of 128 bits which is represented by Equation 4, and generates initial round function values $X_0[0]$, $X_0[1]$, $X_0[2]$, and $X_0[3]$ from the pieces of sub-plain text P[0], P[1], P[2], and P[3], respectively, using the following Equation 16:

$$X_0[k] \leftarrow P[k], 0 \leq k \leq 3 \quad (16)$$

The round function processing unit 400 repeatedly processes a round function using the round key generated by the key scheduler unit 200 and the initial round function values generated by the initial conversion unit 300. In this case, the number of times the round function processing unit 400 repeatedly processes the round function is 24 if the master key has a length of 128 bits, 28 if the master key has a length of 192 bits, and 32 if the master key has a length of 256 bits. The round function processing unit 400 processes a round function, such as that shown in the following Equation 17, in an i-th round:

$$X_{i+1}[0] \leftarrow ROL_9((X_i[0] \oplus RK_i[0]) + (X_i[1] \oplus RK_i[1])),$$

$$X_{i+1}[1] \leftarrow ROL_5((X_i[1] \oplus RK_i[2]) + (X_i[2] \oplus RK_i[3]))$$

$$X_{i+1}[2] \leftarrow ROL_3((X_i[2] \oplus RK_i[4]) + (X_i[3] \oplus RK_i[5]))$$

$$X_{i+1}[3] \leftarrow X_i[0] \quad (17)$$

where $X_i[0]$, $X_i[1]$, $X_i[2]$, and $X_i[3]$ denote the results of the round function in an (i−1)-h round, ⊕ denotes an eXclusive OR (XOR) operation, + denotes a modulo $2^{32}$ addition operation, $ROL_a(x)$ denotes the function of circularly shifting value x having a length of 32 bits to the left by "a" bits and outputting the resulting value, and $ROR_a(x)$ denotes the function of circularly shifting value x having a length of 32 bits to the right by "a" bits and outputting the resulting value.

Figure 3:
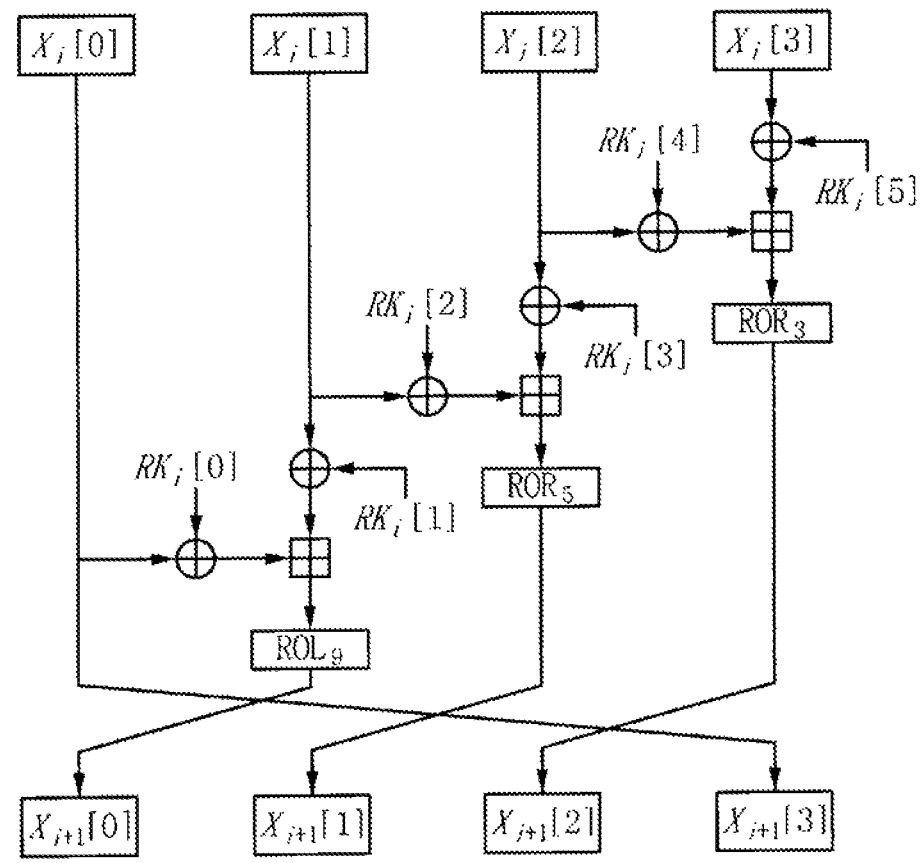
FIG. 3 is a diagram illustrating the processing of a round function by the round function processing unit, shown in FIG. 1, in an i-th round.

The above-described processing of the round function of the round function processing unit 400 in the i-th round may be illustrated, as shown in FIG. 3. Here, the rightmost bit of a 32-bit worn corresponds to the least significant bit (LSB).

The final conversion unit 500 generates ciphertext (hereinafter designated as "C") by consecutively arranging the resulting values of the round function processed by the processing unit 400 in a final round. The final conversion unit 500 generates ciphertext C by consecutively arranging the resulting values $X_r[0]$ to $X_r[3]$ in a final round, that is, an r-th round (where r=24 if the master key has a length of 128 bits, r=28 if the master key has a length of 192 bits, and r=32 if the master key has a length of 256 bits). That is, the final conversion unit 500 converts an output result $X_r(=X_r[0]\|X_r[1]\|X_r[2]\|X_r[3])$ in the r-th round into ciphertext C $(=C[0]\|C[1]\|C[2]\|C[3])$ using the following Equation 18:

$$C[k] \leftarrow X_r[k], 0 \leq k \leq 3 \quad (18)$$

Finally, the ciphertext output unit 600 outputs the ciphertext generated by the final conversion unit 500 to a user.

A method of decrypting ciphertext output according to the present invention into plain text is performed by inversely performing the overall encryption process of the encryption apparatus 10 except the operation the key scheduler unit 200. Furthermore, in the decryption process, a mod $2^{32}$ subtraction operation instead of a mod $2^{32}$ addition operation should be performed.

The encryption method according to the present invention will be described below. In the following description, descriptions that are the same as descriptions of the operation of the encryption apparatus according to the present invention given in conjunction with FIGS. 1 to 3 will be omitted.

Figure 4:
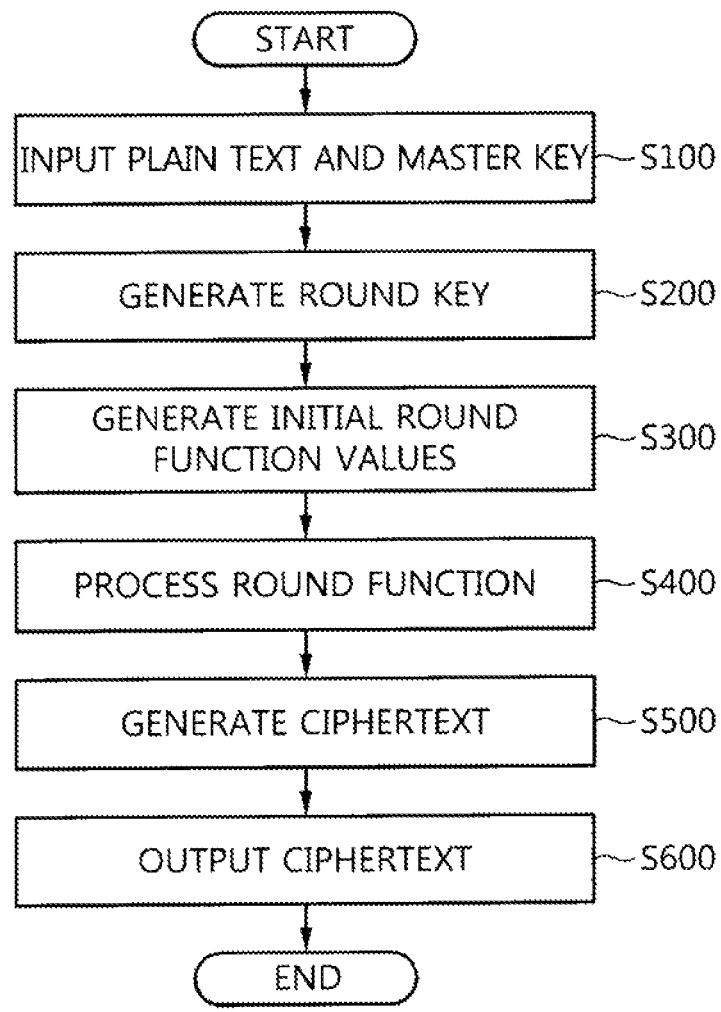
FIGS. 4 and 5 are flowcharts illustrating an encryption method according to the present invention.

FIG. 4 is a flowchart illustrating the encryption method according to the present invention.

Referring to FIG. 4, in the encryption method according to the present invention, first, the user interface unit receives plain text and a master key from a user at step S100. In this case, the plain text and the master key may be input to the user interface unit by the user at the sane time.

Thereafter, the key scheduler unit generates a round key using the master key received from the user interface unit at step S200. In this case, the round key generated at step S200 has a length of 192 bits, and may be formed by consecutively arranging sub-round keys $RK_i[0]$, $RK_i[1]$, $RK_i[2]$, $RK_i[3]$, $RK_i[4]$, and $RK_i[5]$ each having a length of 32 bits.

Thereafter, the initial conversion unit generates initial round function values from the plain text received from the user interface unit at step S300. In this case, at step S300, pieces of sub-plain text P[0], P[1], P[2], and P[3] each having a length of 32 bits may be extracted from the plain text having a length of 128 bits and initial round function values $X_0[0]$, $X_0[1]$, $X_0[2]$, and $X_0[3]$ are generated from the pieces of sub-plain text P[0], P[1], P[2], and P[3], respectively.

Thereafter, at step S400, the round function processing unit repeatedly processes a round function using the round key generated at step S200 and the initial round function values generated at step S300. Here, at step S400, the resulting values $X_{i+1}[0]$, $X_{i+1}[1]$, $X_{i+1}[2]$, and $X_{i+1}[3]$ of a round function in an i-th round may be computed by processing the round function based on the round key and the initial round function values. Furthermore, at step S400, $X_{i+1}[0]$ may be computed using Equation $X_{i+1}[0] \leftarrow ROL_9((X_i[0] \oplus RK_i[0]) + (X_i[1] \oplus RK_i[1]))$, $X_{i+1}[1]$ may be computed using Equation $X_{i+1}[1] \leftarrow ROL_5((X_i[1] \oplus RK_i[2]) + (X_i[2] \oplus RK_i[3]))$, $X_{i+1}[2]$ may be computed using Equation $X_{i+1}[3] \leftarrow ROL_3((X_i[2] \oplus RK_i[4]) + (X_i[3] \oplus RK_i[5]))$, and $X_{i+1}[3]$ may be computed using Equation $X_{i+1}[3] \leftarrow X_i[0]$. Here, $X_i[0]$, $X_i[1]$, $X_i[2]$, and $X_i[3]$ denote the results of the round function in an (i−1)-th round, ⊕ denotes an XOR operation, + denotes a modulo $2^{32}$ addition operation, $ROL_a(x)$ denotes the function of circularly shifting value x having a length of 32 bits to the left by "a" bits and outputting the resulting value, and $ROR_a(x)$ denotes the function of circularly shifting value x having a length of 32 bits to the right by "a" bits and outputting the resulting value.

Thereafter, at step S500, the final conversion unit generates ciphertext from the resulting values of the round function processed in a final round at step S400. In this case, at step S500, ciphertext is generated by consecutively arranging the resulting values of the round function obtained in a final round.

Finally, the ciphertext output unit outputs the ciphertext generated at S500 step to the user at step S600.

Figure 5:
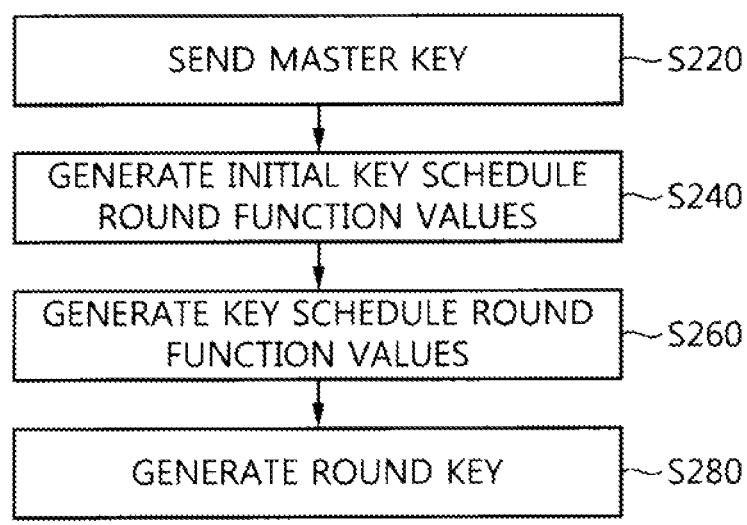

FIG. 5 is a flowchart illustrating step S200, that is, the round key generation step shown in FIG. 4, in greater detail.

Referring to FIG. 5, at step S200, first, the master key input unit receives a maser key from the user interface unit at step S220, and the key schedule round function value generation unit generates initial key schedule round function values from respective sub-master key values that constitute the master key at step S240.

Thereafter, the round key generation unit generates key schedule round function values using the initial key schedule round function values, generated at step S240, and fixed constant values at step S260, and generates a round key by consecutively arranging the key schedule round function values at step S280.

The above-described encryption method according to the present invention may be implemented as a program and then stored in a computer-readable storage medium (for example, CD-ROM, RAM, a floppy disk, a hard disk, a magneto-optical disk, flash memory, or the like).

The present invention has the advantage of providing an encryption technique that is composed only of Addition, Rotation and XOR (ARX) operations that are generally used in existing CPUs and that are easy to adopt.

Furthermore, the present invention has the advantage of being able to perform encryption using a smaller number of cycles in a CPU because an encryption process is performed using the combination of operations that enable parallel operations using temporary variables.

Moreover, the present invention has the advantage of guaranteeing security against all conventional block cipher attacks.

Although the preferred embodiments of the present invention have been disclosed for illustrative purposes, those skilled in the an will appreciate that various modifications, additions and substitutions are possible, without departing from the scope and spirit of the invention as disclosed in the accompanying claims.

What is claimed is:

1. An encryption apparatus comprising:
a user interface circuit configured to receive plain text to be encrypted and a master key, the plain text including a plurality of consecutive sub-plain texts;
a key scheduler circuit configured to generate a round key $RK_i$ from the master key, the round key being formed by consecutively arranging a plurality of sub-round keys;
an initial conversion circuit configured to generate initial round function values $X_o$ from the sub-plain texts of the plain text;
a round function processing circuit configured to repeatedly process a round function using the round key and the initial round function values and compute resulting values $X_i$ of the round function by performing XOR, addition and rotation operations on the sub-round keys of the round key $RK_i$ and previous resulting values $X_{i-1}$; and
a final conversion circuit configured to generate ciphertext from resulting values of the round function processed in a final round by the round function processing circuit,
wherein the round function processing circuit computes $X_{i+1}[0]$ using Equation $X_{i+1}[0] \leftarrow ROL_9((X_i[0] \oplus RK_i[0])+(X_i[1] \oplus RK_i[1]))$, computes $X_{i+1}[1]$ using Equation $X_{i+1}[1] \leftarrow ROR_5((X_i[1] \oplus RK_i[2])+(X_i[2] \oplus RK_i[3]))$, computes $X_{i+1}[2]$ using Equation $X_{i+1}[2] \leftarrow ROR_3((X_i[2] \oplus RK_i[4])+(X_i[3] \oplus RK_i[5]))$, and computes $X_{i+1}[3]$ using Equation $X_{i+1}[3] \leftarrow X_i[0]$, wherein $X_i[0]$, $X_i[1]$, $X_i[2]$ and $X_i[3]$ denote the results of the round function in an (i−1)-th round, $\oplus$ denotes an XOR operation, + denotes a modulo $2^{32}$ addition operation, $ROL_a(x)$ denotes a function of circularly shifting value x having a length of 32 bits to the left by "a" bits and outputting the resulting value, and $ROR_a(x)$ denotes a function of circularly shifting value x having a length of 32 bits to the right by "a" bits and outputting the resulting value.

2. The encryption apparatus of claim 1, wherein the key scheduler circuit comprises:
a master key input circuit configured to receive the master key from the user interface circuit;
a key schedule round function value generation circuit configured to generate initial key schedule round function values from respective sub-master key values that constitute the master key; and
a round key generation circuit configured to generate key schedule round function values using the initial key schedule round function values and fixed constant values and generate the round key by consecutively arranging the key schedule round function values.

3. The encryption apparatus of claim 2, wherein the round key has a length of 192 bits, and is formed by consecutively sub-round keys arranging sub-round keys $RK_i[0]$, $RK_i[1]$, $RK_i[2]$, $RK_i[3]$, $RK_i[4]$, and $RK_i[5]$ each having a length of 32 bits.

4. The encryption apparatus of claim 3, wherein the initial conversion circuit extracts pieces of sub-plain text $P[0]$, $P[1]$, $P[2]$, and $P[3]$ each having a length of 32 bits from the plain text having a length of 128 bits, and generates initial round function values $X_0[0]$, $X_0[1]$, $X_0[2]$, and $X_0[3]$ from the pieces of sub-plain text $P[0]$, $P[1]$, $P[2]$, and $P[3]$, respectively.

5. The encryption apparatus of claim 4, wherein the round function processing circuit computes resulting values $X_{i+1}[0]$, $X_{i+1}[1]$, $X_{i+1}[2]$, and $X_{i+1}[3]$ of a round function in an i-th round by processing the round function based on the round key and the initial round function values.

6. The encryption apparatus of claim 1, wherein the final conversion circuit generates the ciphertext by consecutively arranging the resulting values of the round function obtained in the final round.

7. The encryption apparatus of claim 1, further comprising a ciphertext output circuit configured to output the ciphertext generated by the final conversion circuit.

8. An encryption method comprising:
receiving, by a user interface circuit, plain text to be encrypted and a master key, the plain text including a plurality of consecutive sub-plain texts;
generating, by a key scheduler circuit, a round key $RK_i$ from the master key, the round key being formed by consecutively arranging a plurality of sub-round keys;
generating, by an initial conversion circuit, initial round function values $X_0$ from the sub-plain texts of the plain text;
repeatedly processing, by a round function processing circuit, a round function using the round key and the initial round function values to compute resulting values $X_i$ of the round function by performing XOR, addition and rotation operations on the sub-round keys of the round key $RK_i$ and previous resulting values $X_{i-1}$; and
generating, by a final conversion circuit, ciphertext from resulting values of the round function processed in a final round by the round function processing circuit,
wherein the repeatedly processing a round function using the round key and the initial round function values comprises computing $X_{i+1}[0]$ using Equation $X_{i+1}[0] \leftarrow ROL_9((X_i[0] \oplus RK_i[0])+(X_i[1] \oplus RK_i[1]))$, computing $X_{i+1}[1]$ using Equation $X_{i+1}[1] \leftarrow ROR_5((X_i[1] \oplus RK_i[2])+(X_1[2] \oplus RK_i[3]))$, computing $X_{i+1}[2]$ using Equation $X_{i+1}[2] \leftarrow ROR_3((X_i[2] \oplus RK_i[4])+(X_i[3] \oplus RK_i[5]))$, and computing $X_{i+1}[3]$ using Equation $X_{i+1}[3] \leftarrow X_1[0]$, wherein $X_i[0]$, $X_i[1]$, $X_i[2]$, and $X_i[3]$ denote the results of the round function in an (i−1)-th round, $\Delta$ denotes an XOR operation, +denotes a modulo $2^{32}$ addition operation, $ROL_a(x)$ denotes the function of circularly shifting value x having a length of 32 bits to the left by "a" bits and outputting a resulting value, and $ROR_a(x)$ denotes a function of circularly shifting value x having a length of 32 bits to the right by "a" bits and outputting the resulting value.

9. The encryption method of claim 8, wherein the generating a round key from the master key comprises:
receiving, by a master key input circuit, the master key from the user interface circuit;

generating, by a key schedule round function value generation circuit, initial key schedule round function values from respective sub-master key values that constitute the master key; and generating, by a round key generation circuit, key schedule round function values using the initial key schedule round function values and fixed constant values, and generating, by the round key generation circuit, the round key by consecutively arranging the key schedule round function values.

10. The encryption method of claim 9, wherein the round key has a length of 192 bits, and is formed by consecutively sub-round keys arranging sub-round keys $RK_i[0]$, $RK_i[1]$, $RK_i[2]$, $RK_i[3]$, $RK_i[4]$, and $RK_i[5]$ each having a length of 32 bits.

11. The encryption method of claim 10, wherein the generating initial round function values from the plain text comprises extracting pieces of sub-plain text P[0], P[1], P[2], and P[3] each having a length of 32 bits from the plain text having a length of 128 bits, and generating initial round function values $X_0[0]$, $X_0[1]$, $X_0[2]$, and $X_0[3]$ from the pieces of sub-plain text P[0], P[1], P[2], and P[3], respectively.

12. The encryption method of claim 11, wherein the repeatedly processing a round function using the round key and the initial round function values comprises computing resulting values $X_{i+1}[0]$, $X_{i+1}[1]$, $X_{i+1}[2]$, and $X_{i+1}[3]$ of a round function in an i-th round by processing the round function based on the round key and the initial round function values.

13. The encryption method of claim 8, wherein the generating ciphertext from resulting values of the round function processed in a final round comprises generating the ciphertext by consecutively arranging the resulting values of the round function obtained in the final round.

14. The encryption method of claim 8, further comprising outputting, by a ciphertext output circuit, the ciphertext generated by the final conversion circuit.

* * * * *